United States Patent [19]
Fries et al.

[11] 3,872,783
[45] Mar. 25, 1975

[54] FRYING APPARATUS

[75] Inventors: Edward W. Fries, Jessup, Md.; Gordon Joseph White, Aylesbury, England

[73] Assignee: DCA Food Industries, Inc., New York, N.Y.

[22] Filed: Mar. 12, 1973

[21] Appl. No.: 339,991

[52] U.S. Cl.......................... 99/407, 99/354, 99/442
[51] Int. Cl. ............................................. A47j 37/12
[58] Field of Search.............. 99/407, 325, 339–340, 99/354, 371, 403–404, 405–406, 408–409, 442, 443; 134/80, 117, 119–120, 121; 222/333, 385

[56] References Cited
UNITED STATES PATENTS

| | | | |
|---|---|---|---|
| 1,486,986 | 3/1924 | Morris et al. | 99/405 X |
| 1,807,820 | 6/1931 | Bergner | 99/354 |
| 2,104,283 | 1/1938 | Webster | 134/121 UX |
| 3,022,722 | 2/1962 | Arvan | 99/405 X |
| 3,072,300 | 1/1963 | Thomas | 222/333 |
| 3,182,166 | 5/1965 | Bohm et al. | 99/325 UX |

*Primary Examiner*—Robert L. Bleutge
*Assistant Examiner*—Arthur O. Henderson
*Attorney, Agent, or Firm*—Amster & Rothstein

[57] ABSTRACT

A frying apparatus adapted to fry doughnuts or other comestibles including a frying kettle having an outer main kettle and an inner reserve kettle. An ejector device automatically deposits batter to be fried into the main kettle which, along with the inner reserve kettle, rotates at a predetermined rate. The batter is deposited into the main kettle and is fried in oil disposed in the main kettle. A support plate, operable by a cam mechanism, is adapted to flip the doughnut for frying the doughnut on the other side. The inner kettle includes a reserve supply of frying oil which is transported to the main kettle by a scoop pipe which is pivotally mounted in the kettle.

5 Claims, 3 Drawing Figures

FRYING APPARATUS

This invention relates to apparatus for frying comestibles, such as for example, cake doughnuts.

According to the invention, such an apparatus comprises a frying kettle which is rotatable about a vertical axis and includes an inner reserve kettle surrounded by a main kettle in which the comestibles are fried, both kettles being adapted to contain frying fat; a spider or grid in the main kettle to keep the comestibles in a desired position; means for turning the comestibles being fried in the main kettle, the said means being automatically operable at a predetermined angular position or positions during the rotation of the main kettle; a heater in the main kettle; and a container for material to be fried, the said container having an ejector device which is automatically operable at predetermined intervals related to the speed of rotation of the main kettle, to deliver a portion of material to be fried to the main kettle whereby the comestible can be fried.

Figure 1:
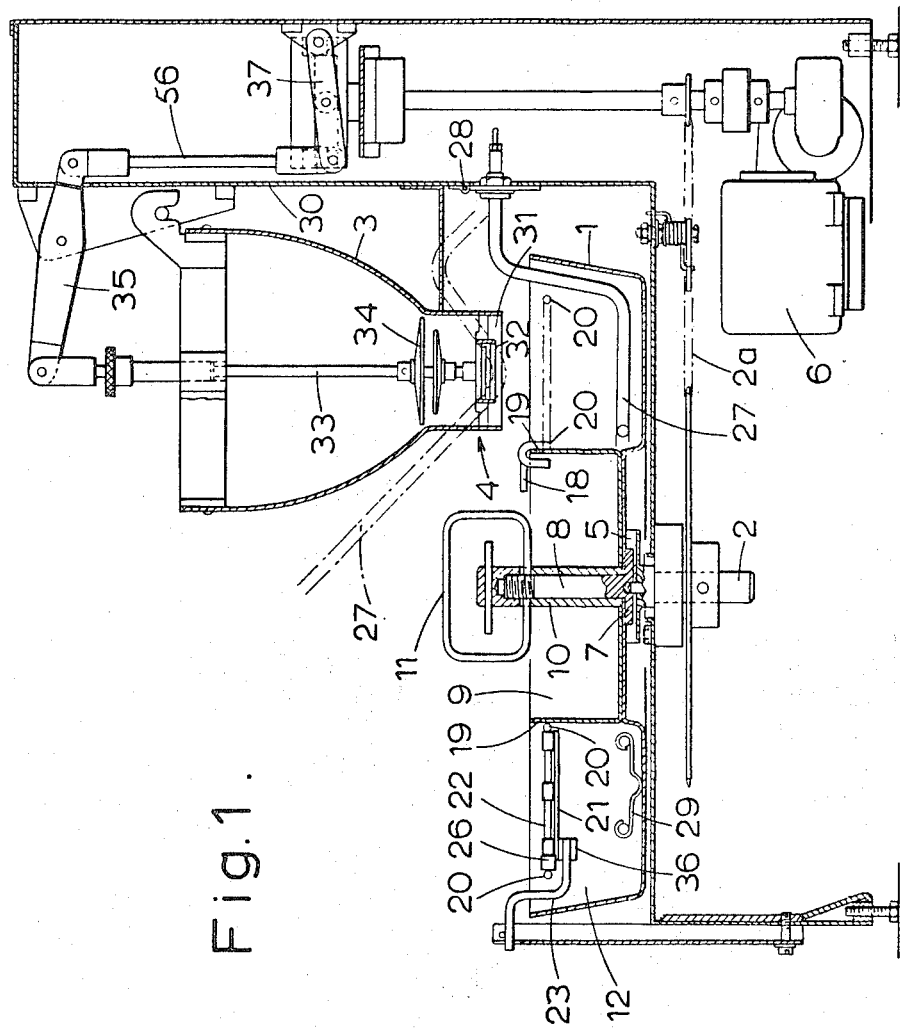
FIG. 1 is an elevation of a frying apparatus according to the invention.

In the illustrated embodiment of the invention, an apparatus for frying doughnuts or other comestibles comprises a frying kettle 1 which is adapted to contain frying fat, i.e., oil, and is driven by a vertical drive shaft 2 so as to be rotatable about a vertical axis. The frying kettle 1 has an open top. A hopper 3 for material to be fried is arranged above the open top of the kettle 1. This hopper 3 is provided with an ejector device 4 for ejecting a shaped portion of the material, for example, a portion shaped to form a ring doughnut, at fixed intervals. The ejected portion drops into the fat in the kettle and the kettle rotates. The portions are dropped into the kettle at regular time intervals so that the portions are regularly spaced in the frying kettle. The portions of material dropped into the kettle are fried during the rotation of the kettle to produce the desired comestible. Means to be hereinafter described are provided for turning the articles during the frying at a desired angular position during the travels of the kettle. The frying operation is completed after less than one revolution of travel of the kettle 1 and means are provided for removing the fried comestible from the kettle before the kettle has completed one revolution.

The kettle 1 is of shallow dish shape and is removably fitted on a support head 5 at the top of the vertical drive shaft 2. The shaft 2 is connected by a chain drive 2a to a suitable electric motor 6. The support head 5 has a slot in which a key 7 on the bottom of the kettle is located so that the kettle rotates with the head and drive shaft, but is easily removable from the head as desired. An extension 8 of the drive shaft 2 extends through the bottom of the kettle 1 and projects above the bottom of the kettle, there being a liquid tight seal between the shaft extension 8 and the kettle 1. An inner reserve kettle 9 is supported on the bottom of the main kettle 1 and has a central vertical tube 10 which fits over the shaft extension 8. A pin or clip 11 passes through registering apertures in the tube 10 and the shaft extension 8 above the normal level of fat in the main kettle so that the reserve kettle 9 is secured in position and is rotatable with the main kettle 1. Thus, the reserve kettle 9 cooperates with the main kettle 1 to define an annular kettle portion 12 in which the comestibles are fried.

Figure 2:
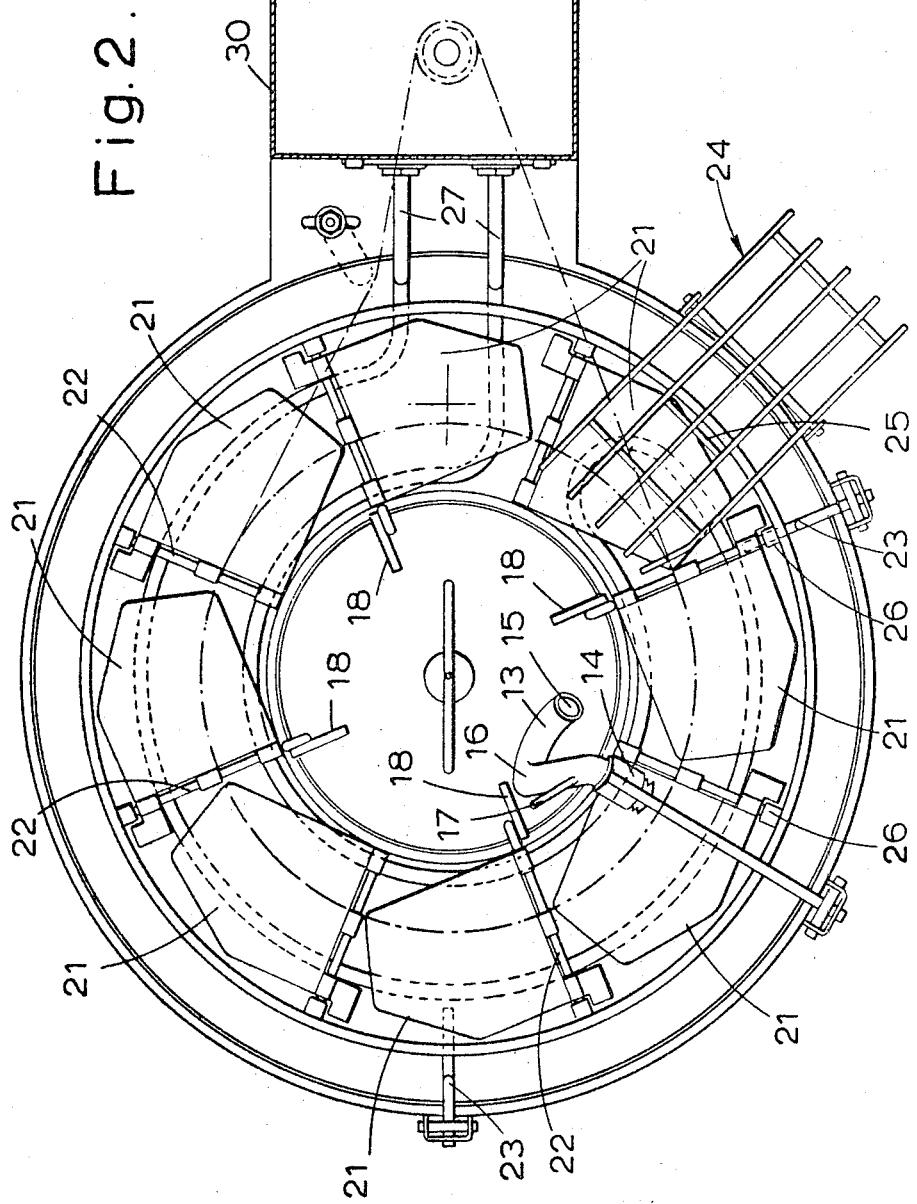
FIG. 2 is a plan view of the same apparatus, with part of the apparatus removed.

The purpose of the reserve kettle 9 is to provide a reserve of liquid fat which can be passed to the main kettle 1 to top up the fat therein to compensate for the loss of fat in the main kettle consequent on the frying operation. Liquid fat is passed from the reserve kettle 9 to the main kettle 1 by means of a scoop pipe 13 (FIG. 2) pivotally secured to a bracket 14 fixed to the apparatus so as not to be rotatable with the main and reserve kettles and extending over the top part of the kettle. This scoop pipe 13 is open at both ends. It has a curved and twisted shape such that one end 15 dips into the liquid in the reserve tank when the scoop pipe is in a normal or pick-up position. This end 15 of the scoop pipe opens in a direction opposite to the direction of rotation of the reserve kettle so that it will scoop up liquid as the reserve kettle rotates 9, the liquid scooped up being retained in a bend 16 in the scoop pipe. A lift arm 17 is fixed to the scoop pipe 13. One of several lift projections 18 on the kettle engages this lift arm 17 as the kettle rotates and is shaped and positioned so as to cause the scoop arm 13 to swing upwards about its pivot so that the liquid in the scoop pipe can run out of the other end of the scoop pipe which is positioned above the main kettle. Thus, liquid fat can run into the main kettle to top up the supply of fat in that kettle. Continued rotation of the kettles will cause the lift arm 17 to move clear of the lift projection 18 so that the scoop pipe drops back to its original position. As the kettles rotate the lift arm engages each lift projection 18 in turn so that the swinging movement of the scoop pipe is repeated. A series of holes 19 are provided in the wall of the reserve kettle at the desired maximum level of liquid in the main kettle but above the normal level of liquid in the reserve kettle. If the level of liquid in the main kettle rises above the desired maximum level, liquid can, therefore, run through these holes back to the reserve tank.

An annular wire spider or grid 20 is arranged horizontally in the main kettle to retain the portions of material being fried in desired positions for frying. The wire spider or grid defines a series of spaced partitions including a series of vertical wire fingers. The space between each spaced partition is adapted to receive one floating doughnut. This spider or grid 20 is carried by the reserve kettle 9.

Pivotally mounted on the spider or grid 20 in angularly spaced relationship are a plurality of support plates or hands 21 only one of which is illustrated in FIG. 1. One of these plates or hands is provided for each portion of material supplied from the hopper 3. In a particularly convenient construction, the hopper ejector device 4 is arranged to deliver eight portions of materials into the kettle 1 during each revolution of the kettle. This apparatus is, therefore, provided with eight hands 21. However, it will be appreciated that a greater or lesser number of hands could be provided depending on the size of the machine and the desired output of fried cakes. These hands are arranged to prevent portions of material being fried from penetrating too deeply in the fat in the kettle.

Each hand 21 is arranged to pivot about a spindle 22 extending radially of the main kettle 1 and above the spider or grid 20. Each hand 21 has an extension or cam follower member 36 extending rearwardly of the hand in the direction of travel of the main kettle. A series of abutments or cam surfaces 23 are so arranged that as the kettle rotates, the cam follower members of the hands ride over each of these cam surfaces in turn. This causes the hands to swing about their pivots to turn over the material being fried and, finally, to guide the completely fried cakes on to a take-off grid 24. Each abutment is a rod shape so as to have an active part below the level of fat in the kettle.

The take-off grid 24 extends over a portion of the kettle at the take-off position. It is tiltable so that the fried cakes can slide off the grid. The grid 24 is caused to tilt by engagement between a tilt arm 25 fixed to the grid and a suitable projection or abutment 26 on the spider. Specifically, grid 24 is positioned to intercept a finished doughnut, the grid being tilted or pivoted to enable the doughnut to slide off the grid to an appropriate tray or the like when the kettle reaches a predetermined angular position.

An electric immersion heater element 27 is fitted in the main kettle. This element surrounds the reserve kettle. It is mounted on a pivot 28 outside the kettle so that it can be swung upwards to the position shown in broken lines in FIG. 1 to permit the main kettle to be removed from its drive shaft as desired. The element 27 is supported on one or more spacers 29 so that it does not touch the bottom of the kettle. A thermostat (not shown) responsive to the temperature of fat in the main kettle controls the operation of the immersion heater 27. Pilot lights (not shown) are provided to give an indication of whether or not the thermostat and the electrical heater are in operation, and the power is connected.

The hopper 3 is supported on an upright 30 so that its outlet 31 is above the open top of the main kettle. The outlet 31 of the hopper has a closure 32 which is opened or closed by the upward or downward movement of a vertically displaceable plunger 33 which is also provided with means 34 for cutting the material being discharged to a desired cake shape. Such an arrangement is known and forms no part of the present invention.

The plunger 33 is raised and lowered by means of a rock arm 35 which is pivotally mounted on the upright. This rock arm 35 is rocked to raise or lower the plunger 33 by a connecting rod 56 which is pivotally connected to the rock arm and to a rock lever 37 which is rocked by a cam driven from the same electric motor 6 that drives the drive shaft for the kettle. The rock arm 35 is thus caused to swing about its pivot to raise and lower the ejector means at any desired interval. Conveniently, the cam is arranged to raise and lower the plunger 33 once during each revolution of the cam. The rock arm 35 is connected to the plunger 33 by an adjustable connection including a clevis joint. If desired this connection can be arranged so that the lenght of the plunger can be adjusted.

Figure 3:
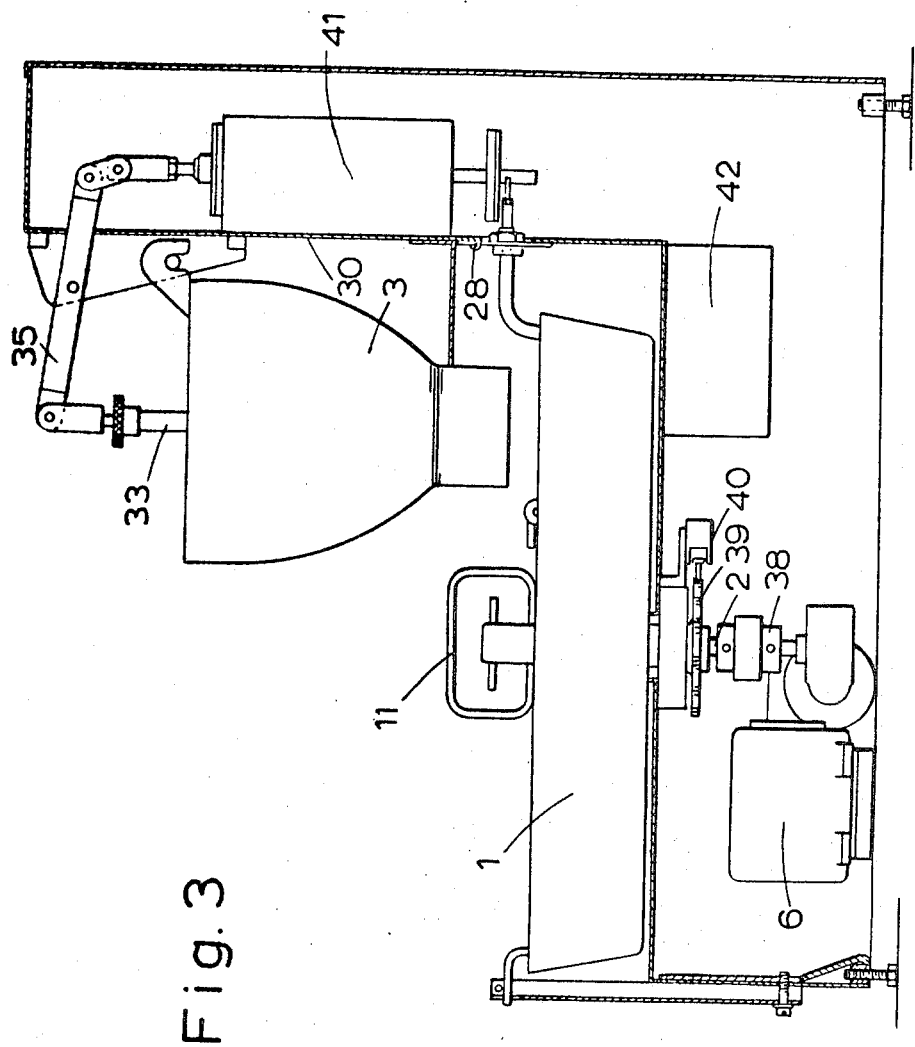
FIG. 3 is a view similar to FIG. 1, but illustrating a modification.

FIG. 3 illustrates a modification. In this figure, like parts are designated by the same reference numerals. In this modification the electric drive motor 6 directly drives the vertical drive shaft 2 to which it is coupled by a flexible coupling 38. An eight-lobe cam 39 is rotatable with the shaft 2 and is arranged to operate a micro-switch 40 which is connected in series with a double-acting electrical solenoid 41 acting on a rocker arm 35 connected with the plunger 33. The number of lobes on the cam 39 correspond with the number of hands 21 on the spider. Thus, with eight hands 21 there are eight lobes on the cam so that eight portions of material are delivered during each rotation of the cam and kettle.

The electrical connection between the micro-switch 40 and the solenoid 41 is through a control box 42 containing a transformer and rectifier so that direct electric current is delivered to the solenoid. The control box also includes time delay means arranged to provide a short time delay between the advance and retard strikes of the solenoid. The solenoid also has an independent switch so that the kettle can rotate without material being deposited from the hopper 3.

In order to provide a more complete understanding of the frying apparatus according to the present invention, a typical frying sequence will now be described.

An appropriate frying liquid, such as oil or the like, is introduced into the annular kettle portion 12 of main kettle 1 and into reserve kettle 9. The oil is heated by electric immersion heater element 27 which is fitted into the main kettle. Since the oil in reserve kettle 9 is in close proximity to the oil in kettle portion 12 of main kettle 1, the oil in both kettles is maintained at a comparable temperature.

Main kettle 1 is rotated, along with reserve kettle 9, by an appropriate drive mechanism, such as electric motor 6. As the kettles rotate, dispenser 3 drops batter into the annular kettle portion 12. The batter is dropped into the spaced partitions formed by wire spider or grid 20. By way of example, the batter may be doughnut-shaped. The grid not only helps to support the batter but, by including a series of vertical wire fingers, moves the doughnut such that the doughnut moves in the same direction and at the same speed as the rotating kettle.

The doughnut is also adapted to rest on support plates or hands 21, each spaced partition adapted to include an appropriate plate or hand.

When the kettle reaches a predetermined angular position, hand 21 is rotated 90° by one of the abutments or cam surfaces 23 arranged around the kettle. This causes the hand to swing about its pivot, turning over the doughnut thereby allowing the doughnut to be fried on the other side. Advantageously, the doughnut may be flipped over or turned on its opposite side into a subsequent (or preceding) spaced partition, which partition is empty as a result of the turning of that doughnut into a corresponding partition.

The doughnut may be flipped one or more times, depending, of course, on the number of times that the hand or plate 21 flips the doughnut.

The doughnut is carried in the kettle until the doughnut is intercepted by pivotal grid 24. Advantageously the grid 24 may be disposed at an angle in the kettle in order to intercept the doughnut. The grid is then tilted or pivoted, for example, by projection or abutment 26, allowing the doughnut to slide off grid 24 into a tray or appropriate doughnut-collecting device.

As the kettle continues to rotate, oil is transported from reserve kettle 9 into the frying portion 12 of main kettle 1 by scoop pipe 13, which stores liquid in bend 16. The liquid is allowed to flow out of the scoop as the scoop pipe is pivoted by projection 18. Holes 19 are provided in the walls of the reserve kettle to keep the frying liquid in the main kettle at or below a predetermined maximum level.

The frying apparatus according to this invention may be disassembled relatively easily for cleaning purposes. Additionally, the dispensing hopper may be automatically controlled in order to drop batter into kettle 1 at preselected intervals. Of course, the speed of rotation of kettle 1, as well as the temperature of the frying liquid, may be varied in order to control the frying of the doughnut or other comestible.

The various parts of the apparatus are arranged to be easily dismantled for cleaning, replacement or repair.

What is claimed is:

1. An automatic frying machine comprising a support, a hopper on said support disposed at a first work station and adapted to displace material to be fried into a comestible, a frying kettle on said support having a reserve kettle portion and a main kettle portion and adapted to contain a frying liquid therein and to receive said material, means mounting said frying kettle on said support for rotation about a vertical axis, means operatively connected to said frying kettle for rotating said frying kettle about said vertical axis, an immersion heater in said main kettle disposed in heat exchange relation to said main kettle portion and the frying liquid therein, an extruder device on said hopper which is automatically operable at predetermined intervals relative to the speed of rotation of said frying kettle to deliver portions of said material to said main kettle portion for frying into said comestible, means for supporting and positioning said comestible in said main kettle portion, said supporting and positioning means being adapted to receive said material at said first work station and to advance said comestible to a second work station, and including comestible-turning means intermediate said first and second stations and means for operatively engaging said comestible-turning means during rotation of said frying kettle about said vertical axis for turning said comestibles at least once during frying, and ejector means disposed at said second work station and automatically operable at predetermined intervals relative to the speed of rotation of said frying kettle about the vertical axis, to cooperate with said supporting and positioning means to intercept said individual comestible and remove said individual comestible from the frying kettle.

2. An apparatus as claimed in claim 1 wherein said frying kettle has an open top and is removably fitted on a support head on a drive shaft and said reserve kettle portion is defined by a reserve kettle arranged centrally inside said frying kettle and rotatable therewith, said reserve kettle portion cooperating with said frying kettle to define an annular main kettle portion in which comestibles can be fried and means for intermittently transferring said frying liquid from said reserve kettle portion to said annular main kettle portion of said frying kettle.

3. An apparatus as claimed in claim 2, wherein said transferring means includes a scoop pipe having an opening at one end arranged to scoop liquid from said reserve kettle portion as said reserve kettle rotates and a bend arranged to retain liquid scooped through said open end, said scoop pipe being pivotally mounted and provided with a lift arm engageable with fixed projections as said reserve kettle portion rotates to swing the scoop pipe about its pivot whereby liquid can run from the bend and out through an opening at the other end of said scoop pipe into said annular main kettle portion of said frying kettle.

4. An apparatus as claimed in claim 1 wherein said means for keeping the comestibles in a desired position includes a grid carried by said frying kettle arranged in said main kettle portion of said frying kettle and adapted to receive portions of the material from said ejector device and to retain them in desired positions for frying in said main kettle portion.

5. An apparatus as claimed in claim 1 wherein said ejector means includes a pivotally mounted grid adapted to be pivoted at a predetermined angular position of said frying kettle to direct said finished comestible out of said frying kettle.

* * * * *